United States Patent [19]

Tanahashi et al.

[11] Patent Number: 4,877,262
[45] Date of Patent: Oct. 31, 1989

[54] CYLINDRICAL UPPER SUPPORT FOR SHOCK ABSORBER

[75] Inventors: Haruhiko Tanahashi, Toyota; Yoshikazu Tsukamoto, Komaki; Shinji Miyakawa, Inuyama, all of Japan

[73] Assignees: Tokai Rubber Industries, Ltd.; Toyota Jidosha Kabushiki Kaisha, both of Aichi, Japan

[21] Appl. No.: 274,340

[22] Filed: Nov. 21, 1988

[30] Foreign Application Priority Data

Nov. 27, 1987 [JP] Japan .................. 62-181781[U]

[51] Int. Cl.$^4$ ............................................. B60G 13/00
[52] U.S. Cl. ................................. 280/668; 280/673; 280/710; 280/716
[58] Field of Search ............... 280/668, 673, 710, 716

[56] References Cited

U.S. PATENT DOCUMENTS

| | | | |
|---|---|---|---|
| 4,391,435 | 7/1983 | Pham | 280/710 |
| 4,432,537 | 2/1984 | Pletsch | 280/710 |
| 4,629,168 | 12/1986 | Buma | 280/668 |
| 4,720,086 | 1/1988 | Le Salver et al. | 280/710 |
| 4,773,635 | 9/1988 | Buma | 280/710 |

OTHER PUBLICATIONS

Laid-open publication No. 60-1666509 of unexamined Japanese Patent Application (published on Aug. 29, 1985).
Laid-open publication No. 60-176802 of unexamined Japanese Patent Application (published on Sep. 10, 1985).
Laid-open publication No. 60-175927 of unexamined Japanese Utility Model Application.
Laid-open publication No. 60-175928 of unexamined Japanese Utility Model Application.
Laid-open publication No. 61-99733 of unexamined Japanese Patent Application (published on May 17, 1986).

Primary Examiner—Kenneth R. Rice
Attorney, Agent, or Firm—Oliff & Berridge

[57] ABSTRACT

A cylindrical upper support interposed between a body of a vehicle and a piston rod of a shock absorber of the vehicle, including a generally cylindrical or annular inner rigid member, a generally cylindrical outer rigid member, and an elastic body interposed between the inner and outer rigid members for elastically connecting the inner and outer rigid members. The elastic body has two fluid chambers which are filled with a non-compressible fluid and which are formed in respective intermediate portions thereof as viewed in axial directions of the rigid members, such that the fluid chambers are opposed to each other in a diametric direction of the inner rigid member. One of the inner and outer rigid members has two wing members which extend in a substantially radial direction thereof into the two fluid chambers, respectively, such that each of the two fluid chambers is substantially divided by the corresponding wing member into two sections, and such that the corresponding wing member provides the each fluid chamber with a restricted part through which the two sections communicate with each other.

11 Claims, 2 Drawing Sheets

CYLINDRICAL UPPER SUPPORT FOR SHOCK ABSORBER

BACKGROUND OF THE INVENTION

1. Field of the Invention

The present invention relates in general to a cylindrical upper support used in a suspension system of a motor vehicle, for elastically connecting a body of the vehicle and a piston rod of a shock absorber of the vehicle, and more particularly to such an upper support which is capable of effectively damping or isolating vibrations transmitted through the piston rod in its radial direction, or received in a transverse direction of the vehicle.

2. Discussion of the Prior Art

There is known a cylindrical vibration-isolating upper support of a type which is interposed between the piston rod of the shock absorber and the vehicle body, for elastically connecting the shock absorber and the vehicle body, such that the vibrations applied thereto are suitably damped or isolated. This type of upper support generally consists of a cylindrical or annular inner rigid member to which the piston rod of the shock absorber is fixed, a cylindrical outer rigid member which is disposed radially outwardly of the inner rigid member and fixed to the vehicle body, and an elastic body interposed between the inner and outer rigid members for elastically connecting the two members. The known upper support is adapted to damp or isolate the input vibrations applied between the piston rod of the shock absorber and the vehicle body, primarily based on elastic deformation of the elastic body which connects the inner and outer rigid members.

However, the known cylindrical upper support constructed as described above is limited in its vibration-isolating capability with respect to high-frequency vibrations received through the piston rod in the transverse direction of the vehicle, since the upper support utilizes only elastic deformation of the elasic body for damping or isolating the input vibrations. In this known arrangement, there arises a problem that the vibrations transmitted from the piston rod to toward the vehicle body through the upper support cause unfavorable noises which can be heard within the driver's and passengers' compartments of the vehicle.

SUMMARY OF THE INVENTION

It is accordingly an object of the present invention to provide a cylindrical upper support which is capable of exhibiting excellent isolating capability for vibrations received in its radial direction or the transverse direction of a vehicle, which are transmitted from the piston rod of a shock absorber to the body of the vehicle, thereby reducing noises to be heard within the vehicle.

The above object may be accomplished according to the principle of the present invention, which provides a cylindrical upper support interposed between a body of a vehicle and a piston rod of a shock absorber of the vehicle, for elastically connecting the vehicle body and the shock absorber, comprising: (a) a generally cylindrical or annular inner rigid member to which the piston rod of the shock absorber is fixed; (b) a generally cylindrical outer rigid member which is disposed radially outwardly of the inner rigid member and fixed to the body of the vehicle; (c) an elastic body interposed between the inner and outer rigid members for elastically connecting the inner and outer rigid members. The elastic body has two fluid chambers which are filled with a non-compressible fluid and which are formed in respective intermediate portions thereof as viewed in axial directions of the rigid members, such that the fluid chambers are opposed to each other in a diametric direction of the inner rigid member. One of the inner and outer rigid members has two wing members which extend in a substantially radial direction thereof into the two fluid chambers, respectively, such that each of the two fluid chambers is substantially divided by the corresponding wing member into two sections, and such that the corresponding wing member provides each fluid chamber with a restricted part through which the two sections communicate with each other.

In the cylindrical upper support of the present invention constructed as decribed above, when the vibrations are applied thereto in its radial direction perpendicular to that in which the two fluid chambers are opposed to each other, relative displacements between the inner and outer rigid members in their radial directions causes the non-compressible fluid to flow between the two sections of each fluid chamber through the restricted part defined between the corresponding wing member and the inner wall of the fluid chamber. As a result, the vibrations of a given frequency range to which the retricted parts are adjusted or tuned are effectively isolated, based on resonance of the masses of the fluid. Thus, the present upper support can provide an excellent vibration-isolating effect for the input vibrations within the tuned frequency range.

In the case where the resricted parts are tuned to a frequency range corresponding to that of the vibrations received in the radial direction of the piston rod or the transverse direction of the vehicle while the upper support is installed on the vehicle such that the two fluid chambers are opposed to each other in a vehicle running direction (a longitudinal direction of the vehicle), the radially or transversely applied vibrations are effectively isolated due to the resonance of the masses of the fluid flowing through the restricted parts. In this manner, the vibrations are suitably prevented from being transmitted from the piston rod to the vehicle body, whereby the noises which are heard within the vehicle compartments can be considerably reduced.

In one form of the present invention, the two wing members extend from diametrically opposed parts of an outer circumference of the inner rigid member. In this case, the diameterically opposed parts of the inner rigid member may have respective cutouts through which the wing members extend into the respective fluid chambers.

In another form of the present invention, each of the two wing members includes a generally planar wing portion which extends from diameterically opposed parts of the inner rigid member, and a rubber layer which covers the generally planar wing portion.

In a further form of the present invention, the instant cylindrical upper support further comprises a sealing metal sleeve interposed between the outer rigid member and the elastic body. The upper support may further comprise a sealing rubber sleeve interposed between the outer rigid member and the sealing metal sleeve. In this case, the sealing metal sleeve has diameterically opposed windows alinged with the two fluid chambers, so that the fluid chambers are partially defined by portions of an inner surface of the sealing rubber sleeve alinged with the windows.

In a still further form of the invention, the elastic body is a generally annular member which includes at least one protrusion formed on each of axially opposite end faces thereof, for pressed contact with a mounting bracket attached to the outer rigid member. The above-indicated at least one protrusion may include an annular protrusion. The above-indicated at least one protrusion may further include a plurality of arcuate protrusions which extend in spaced-apart relation with each other in a circumferential direction of the generally annular elastic body. In this case, each of the arcuate protrusions may include at least one boss formed thereon for pressed contact with the mounting bracket.

In a still another form of the invention, the inner rigid member is a generally annular metal member which includes a central ring portion having a center bore, and a pair of diametrically opposed arcuate portions which extend from the ring portion in a radially outward direction of the ring portion. The generally annular metal member has a pair of diametrically opposed cutouts each defined between adjacent ends of the arcuate portions. Further, the wing members extend from diametrically opposed parts of an outer surface of the ring portion which partially define the cutouts.

BRIEF DESCRIPTION OF THE INVENTION

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

To further clarify the concept of the present invention, there will be described in detail the preferred embodiment of the invention in the form of a cylindrical upper support used in a suspension system of a motor vehicle.

Figure 1:
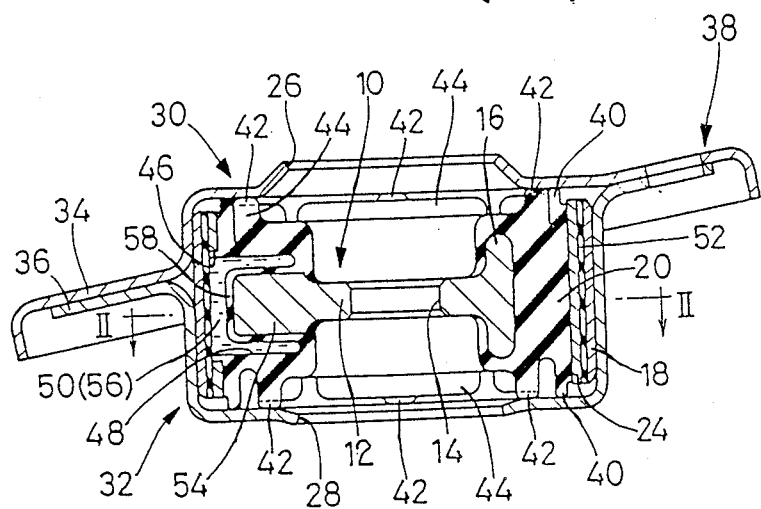
FIG. 1 is an elevational view in axial cross section (taken along line I—I of FIG. 2) of one embodiment of a cylindrical upper support of the present invention.
Figure 2:
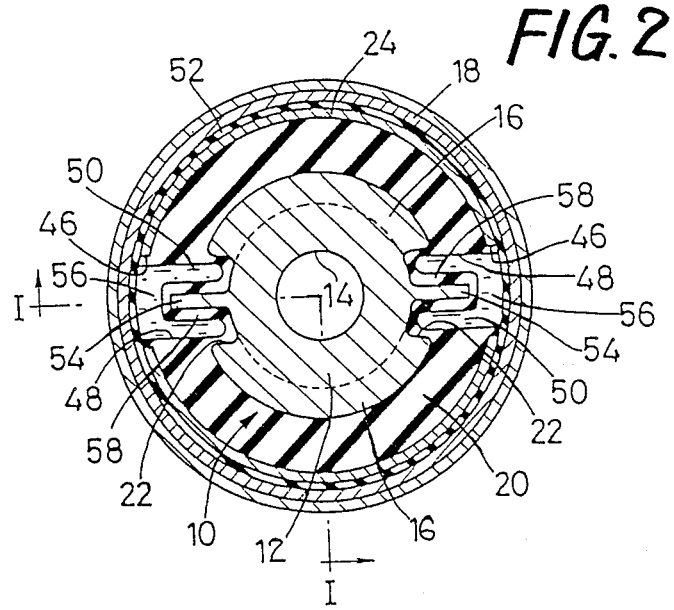
FIG. 2 is a transverse cross sectional view taken along line II—II of FIG. 1.

Referring first to FIGS. 1 and 2 showing the present upper support, reference numeral 10 denotes an inner rigid member in the form of a generally annular inner metal member. The inner metal member 10 includes a ring portion 12 having a center bore 14 formed therethrough, and a pair of arcuate portions 16 which extend from the ring portion in a radially outward direction of the ring portion, and which are opposed to each other in a diametric direction of the inner metal member 10. The ring portion 12 is integrated at its outer circumference with an axially intermediate portion of the arcuate portions 16, as shown in FIG. 1. Reference numeral 18 denotes an outer rigid member in the form of an outer metal sleeve having a generally cylindrical shape. The outer metal sleeve 18 is disposed coaxially with and radially outwardly of the inner metal member 10, with a suitable radial spacing therebetween. Between the inner metal member 10 and the outer metal sleeve 18, there is interposed a generally cylindrical elastice body in the form of a rubber body 20 made of a suitable rubber material, which is adapted to elastically connect the inner metal member 10 and outer metal sleeve 18. As is apparent from FIG. 2, the inner metal member 10 has a pair of cutouts 22, each of which is defined by opposed circumferential end faces of the arcuate portions 16, and a portion of the outer circumference of the ring portion 12. Namely, the cutouts 22 are opposed to each other in a diametric direction of the central ring portion 12.

The rubber body 20 is bonded at an axially middle part of its inner circumference to the outer circumferential surface of the inner metal member 10, by means of vulcanization of an unvulcanized rubber material in a suitable mold, so as to surround the two arcuate portions 16, 16. To the outer circumference of the rubber body 20, there is bonded a sealing metal sleeve 24 during the vulcanization process. The outer metal sleeve 18 is fitted on the outer circumference of the sealing metal sleeve 24, via a sealing rubber layer 52 (which will be described). To the outer circumference of the outer metal sleeve 18, there are attached a first and a second metal fitting 30, 32 having respectice center holes 26, 28, through which a piston rod of a shock absorber of the vehicle extends for attachment to the inner metal member 10. More specifically, the first and second metal fittings 30, 32 are fitted onto the outer metal sleeve 18 from the opposite axial ends of the sleeve 18, such that two flanges 34, 36 extending outwardly from the respective metal fittings 30, 32 are superposed on each other, as shown in FIG. 1. The two metal fittings 30, 32 with the supperposed flanges 34, 36 constitute a mounting bracket 38 which is inclined by a suitable angle with respect to the axis of the inner and outer metal members 10, 18. In the present embodiment, the mounting bracket 38 of the upper support is fixed to the vehicle body (not shown), while the piston rod (not shown) of the shock absorber is inserted through the center bore 14 formed through the ring portion 12 of the inner metal member 10. Thus, the instant upper support elastically connects the vehicle body and the piston rod of the shock absorber.

Figure 3:
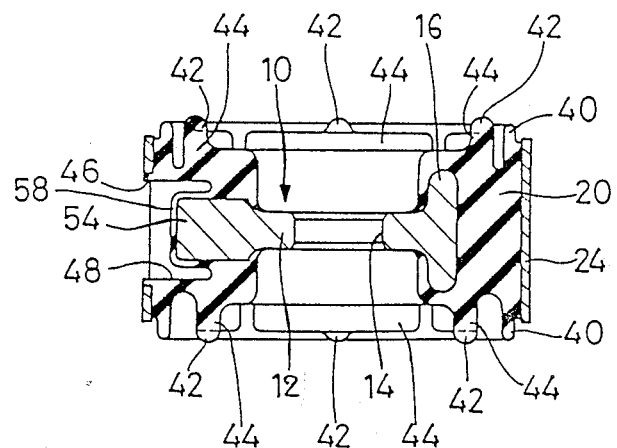
FIG. 3 is an elevational view in axial cross section (taken along line III—III of FIG. 4) of an intermediate product obtained by vulcanization of a rubber material during manufacture of the upper support of FIG. 1.
Figure 4:
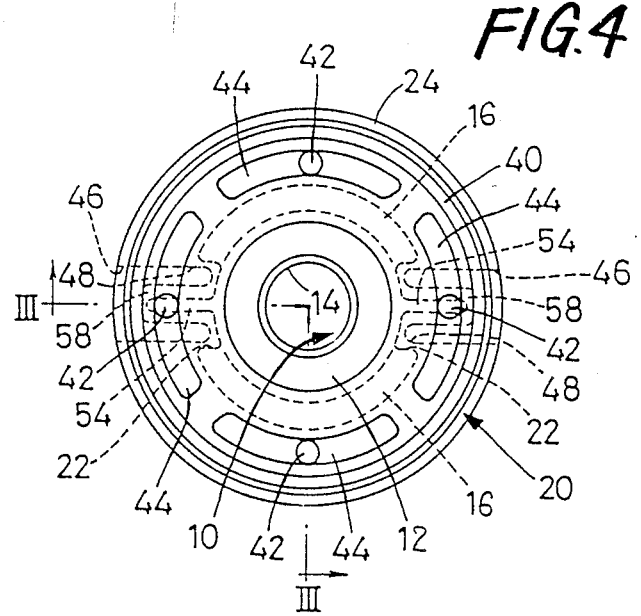
FIG. 4 is a plan view of the intermediate product of FIG. 3.

Referring to FIGS. 3 and 4, the rubber body 20 has a pair of annular protrusions 40 formed on respective axially opposite end faces thereof. Each annular protrusion 40 extends from a radially outer portion of the corresponding axial end face of the rubber body 20. Also formed on each axial end face of the rubber body20 are two pairs of arcuate protrusions 44, which are disposed radially inwardly of the annular protrusion 40. Each arcuate protrusion 44 has a boss 42 formed thereon. The boss 42 is disposed at the circumferentially intermediate part of the correponding arcuate protrusion 44. The four arcuate protrusions 44 are equally spaced from each other in the circumferential direction of the annular rubber body 20, such that the one pair of arcuate protrusions 44 are opposed to each other in a diametric direction in which the above-indicated cutouts 22 are opposed to each other diametrically of the inner metal member 10. The other pair of arcuate protrusions 44 are opposed to each other in a diametric direction perpendicular to that in which the cutouts 22 are diametrically opposed to each other. Upon assembling of the first and second metal fittings 30, 32 and the thus prepared intermediate product of FIG. 3, the axial end face of each annular protrusion 40 and the bosses 42 formed on the arcuate protrusions 44 are brought into pressed contact with the corresponding one of the first and second metal fittings 30, 32, which are moved toward each other on the outer metal sleeve 18 in the axial direction of the outer metal sleeve 18, when the two metal fittings 30, 32 are installed on the outer metal sleeve 18.

As is apparent from FIG. 1, the sealing metal sleeve 24 adhering to the outer circumference of the rubber body 20 is subjected to a suitable drawing operation, whereby the rubber body 20 is radially inwardly precompressed.

The sealing metal sleeve 24 thus fixed to the outer circumference of the rubber body 20 has a pair of rectangular windows 46 formed therethrough, which are diametrically opposed to each other. These windows 46 are aligned with the cutouts 22 in the circumferential direction of the inner metal member 10. On the other hand, the rubber body 20 has a pair of pockets 48 which are open to the respective windows 46. The pockets 48 have a rectangular cross sectional shape corresponding to the rectangular windows 46, 46, and a radial dimension or depth enough to almost reach the outer circumference of the ring portion 12 of the inner metal member 10. These pockets 48 have respective openings which are fluid-tightly closed by the sealing rubber layer 52 interposed between the sealing metal sleeve 24 and the outer metal sleeve 18, whereby a pair of fluid chambers 50, 50 are defined by the rubber body 20 and the sealing rubber layer 52. More specifically, the two fluid chambers 50, 50 are formed in respective intermediate portions of the rubber body 20 as viewed in its axial direction, and are opposed to each other in a diametric direction of the inner metal member 10. The fluid chambers 50, 50 are filled with a non-compressible fluid, such as water and polyalkylene glycol. As shown in FIG. 2, the sealing metal sleeve 24 is interposed between the rubber body 20, and the sealing rubber layer 52 which is fixed to the inner circumference of the outer metal sleeve 18. Since the sealing rubber layer 52 on the outer metal sleeve 18 is fluid-tightly fitted on the seal metal sleeve 24, the fluid chambers 50, 50 are maintained in a fluid-tight condition.

In the instant upper support having the thus formed fluid chambers 50, 50, the inner metal member 10 has two wing portions 54 each having a planar rectangular shape as seen in a plane parallel to the axis of the upper support. These wing portions 54 extend from diametrically opposed parts of the outer circumference of the central ring portion 12 of the inner metal member 10, into the respective fluid chambers 50, 50, through the respective cutouts 22. As shown in FIG. 2, each wing portion 54 is located in a circumferentially intermediate portion of the corresponding cutout 22 of the inner metal member 10. Thus, the wing portions 54 extend in a radial direction of the inner metal member 10, such that each of the fluid chambers 50 is substantially divided by the corresponding wing portion 54 into two sections, as viewed in a circumferential direction of the annular rubber body 20. In this arrangement, there is defined a restricted part 56 between the radial end face of each wing portion 54 and a portion of the inner wall of the fluid chamber 50 (sealing rubber layer 52) which is aligned with the radial end face of the wing portion 54.

When a vibrational load is applied to the instant upper support in its radial direction perpendicular to that in which the fluid chambers 50 are opposed to each other, relative displacements occur between the inner metal member 10 and outer metal sleeve 18, thereby causing elastic deformation of the rubber body 20. As a result, the non-compressible fluid accomodated in each fluid chamber 50 flows in the circumferential direction of the rubber body 20, between the two sections of the fluid chamber 50, through the corresponding restricted part 56. Consequently, the vibrations having a given frequency to which the restricted parts 56 are tuned are effectively isolated, due to resonance of the masses of the non-compressible fluid in the fluid chambers 50. In the present embodiment, the restricted parts 56 are adjusted to a frequency range of the vibrations which are to be applied in the radial direction of the upper support which is parallel to the transverse direction of the vehicle. Accordingly, when the vibrations of the above-indicated frequency range are applied in the radial direction perpendicular to the direction of opposition of the fluid chambers 50, 50, the present upper support can provide an excellent isolating effect for the input vibrations, due to resonance of the masses of the fluid flowing through the restricted parts 56.

Each wing portion 54 which cooperates with the inner wall of the corresponding fluid chamber 50 to define the restricted part 56 therebetween is covered by a rubber layer 58 formed integrally with the rubber body 20. More precisely described, each retricted part 56 is defined between the rubber layer 58 and the inner wall of the fluid chamber 50. It follows from the above description that the two wing portions 54 of the inner metal member 10 and the rubber layers 58 covering the respective wing portions 54 constitute two wing members for providing the fluid chambers 50 with the retricted parts 56.

The thus constructed upper support is installed between and connected to the piston rod of the shock absorber and the vehicle body, such that the fluid chambers 50 are opposed to each other in a diametric direction parallel to the running direction of the vehicle (perpendicular to the transverse direction of the vehicle). Upon application of vibrations to the upper support in the transverse direction of the vehicle, the instant upper support is adapted to sufficiently isolate the vibrations transmitted through the piston rod, based on resonance of the masses of the non-compressible fluid flowing through the restricted part of each fluid chamber 50. Consequently, the input vibrations in the transverse direction of the vehicle are prevented from being transmitted to the vehicle body, which contributes to reduction in the level of noises which are heard within the vehicle.

While the present invention has been described in its presently preferred embodiment, for illustrative purpose only, it is to be understood that the invention is not limited to the details of the illustrated embodiment, and the invention may be otherwise embodied.

In the illustrated embodiment, the wing portions 54 constituting the wing members are formed integrally with the inner metal member 10. However, the wing portions 54 may be provided separately from the inner metal member 10.

Further, the wing members do not necessarily extend from the inner metal member 10. It is possible that the wing members may extend from the outer metal sleeve 18, into the fluid chambers 50.

Although other specific modified embodiments in connection with the shapes or arrangements of relevant components including the inner metal member 10 are not described herein, it will be understood that the invention may be embodied with various other changes, modifications and improvements, which may occur to those skilled in the art, without departing from the sprit and scope of the invention defined in the following claim.

What is claimed is:

1. A cylindrical upper support interposed between a body of a vehicle and a piston rod of a shock absorber of the vehicle, for elastically connecting the vehicle body and the shock absorber, comprising:
   a generally cylindrical or annular inner rigid member to which said piston rod of the shock absorber is fixed;
   a generally cylindrical outer rigid member which is disposed radially outwardly of said inner rigid member and fixed to said body of the vehicle;
   an elastic body interposed between said inner and outer rigid members for elastically connecting the inner and outer rigid members, said elastic body having two fluid chambers which are filled with a non-compressible fluid and which are formed in respective intermediate portions thereof as viewed in axial directions of said rigid members, said fluid chambers being opposed to each other in a diametric direction of said inner rigid member; and
   one of said inner and outer rigid members having two wing members which extend in a substantially radial direction thereof into said two fluid chambers, respectively, such that each of said two fluid chambers is substantially divided by the corresponding wing member into two sections, and such that said corresponding wing member provides said each fluid chamber with a restricted part through which said two sections communicate with each other.

2. A cylindrical upper support according to claim 1, wherein said two wing members extend from diametrically opposed parts of an outer circumference of said inner rigid member.

3. A cylindrical upper support according to claim 2, wherein said diametrically opposed parts of said inner rigid member has respective cutouts through which said wing members extend into the respective fluid chambers.

4. A cylindrical upper support according to claim 1, wherein each of said two wing members includes a generally planar wing portion which extends from diameterically opposed parts of said inner rigid member, and a rubber layer which covers said generally planar wing portion.

5. A cylindrical upper support according to claim 1, further comprising a sealing metal sleeve interposed between said outer rigid member and said elastic body.

6. A cylindrical upper support according to claim 5, further comprising a sealing rubber sleeve interposed between said outer rigid member and said sealing metal sleeve, and wherein said sealing metal sleeve has diameterically opposed windows alinged with said two fluid chambers, whereby said fluid chambers are partially defined by portions of an inner surface of said sealing rubber sleeve alinged with said windows.

7. A cylindrical upper support according to claim 1, wherein said elastic body is a generally annular member which includes at least one protrusion formed on each of axially opposite end faces thereof, for pressed contact with a mounting bracket attached to said outer rigid member.

8. A cylindrical upper support according to claim 7, wherein said at least one protrusion includes an annular protrusion.

9. A cylindrical upper support according to claim 7, wherein said at least one protrusion includes a plurality of arcuate protrusions which extend in spaced-apart relation with each other in a circumferential direction of said generally annular elastic body.

10. A cylindrical upper support according to claim 9, wherein each of said arcuate protrusions includes at least one boss formed thereon for pressed contact with said mounting bracket.

11. A cylindrical upper support according to claim 1, wherein said inner rigid member is a generally annular metal member which includes a central ring portion having a center bore, and a pair of diametrically opposed arcuate portions which extend from said ring portion in a radially outward direction of the ring portion, said generally annular metal member having a pair of diametrically opposed cutouts each defined between adjacent ends of said arcuate portions, said wing members extending from diametrically opposed parts of an outer surface of said ring portion which partially define said cutouts.

* * * * *